Dec. 6, 1955 T. C. SHARP 2,726,287

CROSS-TALK PREVENTION SYSTEM

Filed Aug. 16, 1952

INVENTOR
THOMAS C. SHARP
BY
ATTORNEY

United States Patent Office 2,726,287

Patented Dec. 6, 1955

2,726,287

CROSS-TALK PREVENTION SYSTEM

Thomas C. Sharp, North Hollywood, Calif., assignor to Radio Corporation of America, a corporation of Delaware Application August 16, 1952, Serial No. 304,829

5 Claims. (Cl. 179—100.2)

This invention relates to magnetic sound systems, and particularly to cross-talk or interference prevention between channels in a multi-track magnetic sound recording or reproducing system.

In magnetic sound systems, wherein several tracks are recorded longitudinally of the film and parallel to the center line of the film, particularly with magnetic heads positioned axially and transversely of the film, such as shown in Pettus co-pending U. S. application, Ser. No. 230,403, filed June 7, 1951, now Patent No. 2,644,856, granted on July 7, 1953, there is a certain amount of magnetic coupling between each head which introduces interference in the form of cross-talk. The present invention is directed to a construction which will reduce, if not entirely prevent, such cross-talk.

In several types of multi-track recording and reproducing systems, the heads are generally positioned just before or after the film leaves a stabilizing drum or roller. The heads themselves are separated by magnetic shields such as flat plates of m$\mu$ metal and also housed in a shielding cover of similar material. However, the pole pieces extend beyond the covers, and, therefore, a certain amount of magnetic coupling exists therebetween, particularly when the recording or reproducing gaps are closely adjacent one another.

Cross-talk, therefore, is attributable to two sources. First, when a signal is being recorded in one track position, a small amount of flux passes through the adjacent track area and a low level recording of the signal occurs therein. When the second track is recorded in the adjacent track area and reproduced, the first signal is heard during low level passages of the second signal. This is also true when the first signal is reproduced, its track area having some of the second signal therein. The second source of cross-talk is due to the actual coupling produced by the flux variations generated during detection being induced in an adjacent head. To reduce this coupling and the parasitic recording, the stabilizing drum is constructed in concentric annular non-magnetic sections between which are positioned shielding plates or discs of m$\mu$ metal or similar material. This method of cross-talk prevention has the advantage over electrical neutralization obtained by interconnecting the channels in phase opposition, since the present method will function when the signals are recorded or reproduced at different times, while the electrical method requires simultaneous recording and reproduction of the multiple signals.

The principal object of the invention, therefore, is to facilitate the reduction or elimination of interference between reproduced signals from a multi-magnetic track record.

Another object of the invention is to reduce or eliminate coupling between adjacent magnetic recording or reproducing heads and to confine a recorded signal to its own track area.

A further object of the invention is to provide a stabilizing drum with internal magnetic shields between planes passing through the center of and perpendicular to a plurality of magnetic head gaps for reducing magnetic coupling between a plurality of magnetic recording or reproducing heads and limiting each record to its own area.

A still further object of the invention is to provide an improved magnetic shielding system for reducing cross-talk between multiple magnetic recordings during reproduction.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
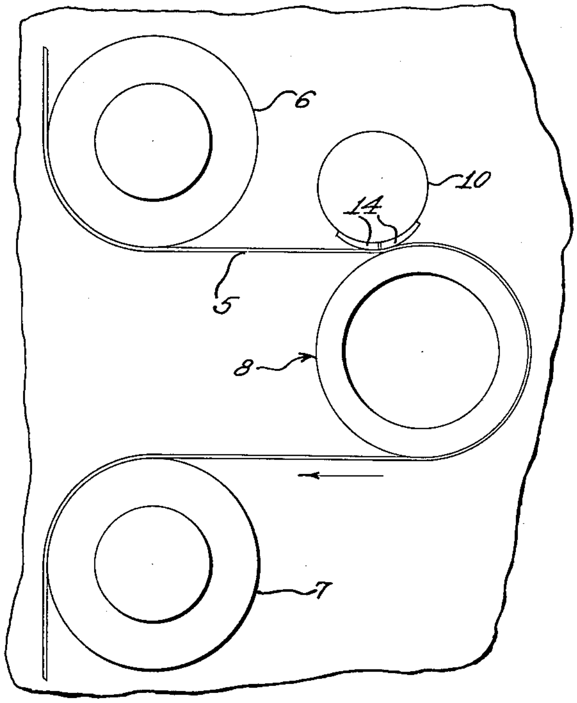
Fig. 1 is an elevational view showing a multiple sound recording system embodying the invention.
Figure 2:
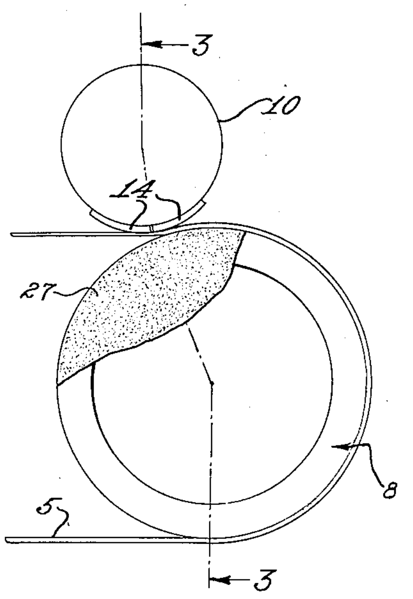
Fig. 2 is an enlarged detail view showing the construction of the stabilizing drum having electromagnetic shields.
Figure 3:
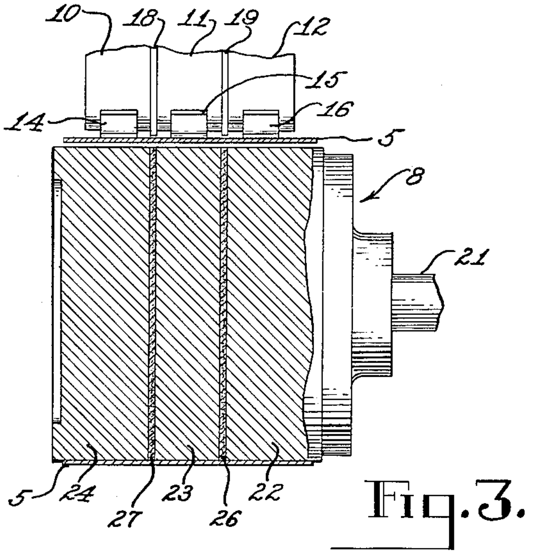
Fig. 3 is a cross-sectional view taken along the line 3—3 of Fig. 2.

Referring now to the drawings, in which the same numerals identify like elements, a magnetic film 5 is advanced over guide rollers 6 and 7 and around a film stabilizing drum 8 in the direction shown by the arrow. The film may be driven by any suitable means, not shown. Positioned and in contact with the film 5 at a point just prior to the passage of the film onto the surface of the drum 8, is a plurality of magnetic heads 10, 11, and 12, each of which has respective recording gaps formed by pairs of pole pieces 14, 15, and 16. Heads 10 and 11 are separated by a m$\mu$ metal disc shield 18, and heads 11 and 12 are separated by a m$\mu$ metal disc shield 19, the edges of the shields being closely adjacent the film, while the three units may be enclosed in a shielding can of m$\mu$ metal.

To reduce the magnetic coupling between the respective pole pieces and present one signal from being recorded in the track areas of other signals, the drum 8 mounted on a shaft 21 is formed of three, annular, non-magnetic sections 22, 23, and 24. Sections 22 and 23 are separated by a thin disc 26 of m$\mu$ metal or similar material, and sections 23 and 24 are separated by a similar disc 27 of m$\mu$ metal or similar material. These shields are opposite shields 19 and 18, respectively, and on the opposite side of the film from shields 19 and 18. Shields 26 and 27 are as close as possible to shield 19 and 18, the closest position being when the heads are in contact with the film when it is on the drum 8. By the use of this type of construction for a stabilizing roller or drum 8, it has been found that induction between the heads and between adjacent sound track areas, and thus, interference between the reproducing channels connected with the respective heads is materially reduced to an amount satisfactory for commercial recording and reproduction.

Although only three heads are shown for purposes of illustration, when additional heads are employed, the drum or roller 8 will have a corresponding number of annular sections 22–24 and shielding discs 26–27.

I claim:

1. An interference prevention system between a plurality of magnetic heads of a multi-magnetic track system comprising a plurality of magnetic heads arranged to record a corresponding plurality of magnetic tracks on a film movable along a predetermined path, means for positioning said film along said path, means positioning said heads adjacent said path to contact said film adjacent said film positioning means, and electromagnetic shields positioned adjacent said film path and on the side of said film path opposite said heads and in planes parallel to and between planes passing through the center of and perpendicular to the gaps of said heads.

2. An interference prevention system in accordance with claim 1, in which said film positioning means is a drum having a plurality of non-magnetic sections, said shields being thin discs separating said sections.

3. A cross-talk prevention system for a multi-track magnetic system employing a drum and a magnetic film arranged to pass along a path over said drum, said system comprising means for advancing said magnetic film over said drum along said path, a plurality of magnetic heads having non-magnetic gaps, said gaps being in alignment transversely of said film path, a plurality of magnetic shields between said heads, and a plurality of magnetic shields in said drum opposite said first plurality of shields.

4. A cross-talk prevention system in accordance with claim 3, in which said drum includes a plurality of annular non-magnetic sections and said drum shields are thin discs separating said sections.

5. A cross-talk prevention system in accordance with claim 3, in which said drum shields are thin discs positioned between planes passing through the center of and perpendicular to the gaps of said heads.

References Cited in the file of this patent

FOREIGN PATENTS 69,273 Norway ---------------- May 18, 1945